United States Patent Office 2,949,753
Patented Aug. 23, 1960

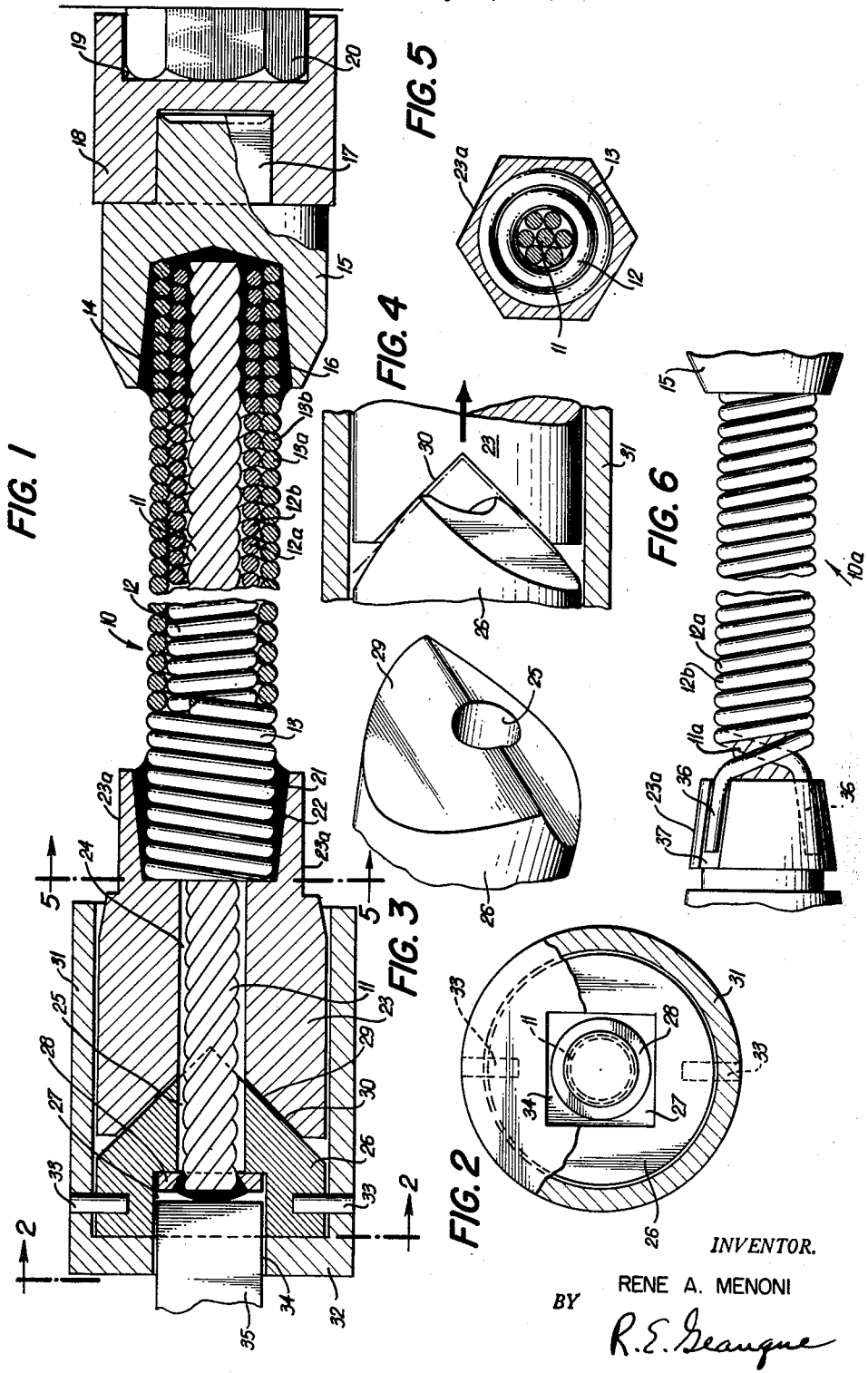

2,949,753

FLEXIBLE TOOL

Rene A. Menoni, 10639 Kester Ave., San Fernando, Calif.

Filed July 14, 1959, Ser. No. 826,947

9 Claims. (Cl. 64—15)

This invention relates to a flexible tool and more particularly to a tool for applying a torque to a fitting through a flexible spring connection which increases in rigidity as the applied torque increases.

Flexible tools presently available have flexible shanks for permitting access to fittings, such as nuts, bolts and screws, which are in locations not readily accessible to tools having straight rigid shanks. The shanks of such flexible tools are usually formed of a center cable surrounded by coil springs which impart the torque from one end of the shank to the other end. This shank construction is susceptible to warping or twisting into a loop or partial loop when large torques are applied thereto and in this condition, the shank is incapable of transmitting the necessary torque.

In the present invention, a central cable is surrounded by one or more coil springs and one end of the cable and of the coil springs is rigidly secured to an end member which cooperates with the fitting. The other end of the coil springs is secured to a cam follower member through which the other end of the central cable loosely projects. This other end of the cable is retained by a cam driver member to which the torque is applied. Upon application of a torque to the cam driver member, this member applies a longitudinal compressive force against the cam follower member in order to compress the springs between the follower member and the end member receiving the fitting. This compression of the springs makes the flexible shank substantially more rigid and permits the transfer of substantially higher torques without the warping or twisting of the shank.

It is therefore an object of the present invention to provide a flexible tool having a flexible shank comprised of coil springs and a central cable and cam means for compressing said springs upon the application of a torque to said tool.

Another object of the present invention is to provide a tool having a flexible shank comprised of coil springs which are compressed to become more rigid along the axis of the shank as the torque is applied to the tool.

A further object of the present invention is to provide a tool having a flexible shank which becomes more rigid as the torque applied to the flexible shank increases.

Another object of the invention is to provide a tool having a flexible shank comprised of coil springs surrounding a central cable and cam means for increasing the rigidity of the shank as the torque applied to the tool increases, said cam means including a member secured to the one end of the coil springs and another member for retaining one end of the cable.

These and other objects of the invention, not specifically set forth above, will become more readily apparent from the accompanying description and drawing in which:

Figure 1 is a longitudinal sectional view, partly in elevation, showing the helical wound coil springs and central cable of the flexible tool.

Figure 2 is an end elevational view, partly in section, along lines 2—2 of Figure 1 and illustrating a square socket for receiving a torque applying wrench.

Figure 3 is a perspective view of the cam driver member of the cam device utilized for compressing the coiled springs.

Figure 4 is a sectional longitudinal view, partly in section, showing an angular displacement between the cam members resulting in compression of the springs.

Figure 5 is a transverse section along lines 5—5 of Figure 1, illustrating the manner in which the coil springs are rigidly connected to the cam follower member and Figure 6 is a side elevational view of a second form of the invention utilizing only one coil spring wound in a single direction around the central cable.

Referring to Figure 1, the tool of the subject invention has a flexible shank 10 which is comprised of a central cable 11 fabricated from high strength steel strands and the cable is surrounded by inner layer 12 and outer layer 13, each formed of two separate helical coils of wire. The coils 12a and 12b forming layer 12 are alternately positioned as are the coils 13a and 13b of the outer layer 13, and the coil wires of these two layers are wound in opposite directions in order to provide for the transmission of torque in opposite directions, as will be later described. One end of all the coil springs and of the central cable 11 are inserted into an opening 14 in an end fitting 15 and the opening 14 is filled with weld metal 16 to rigidly secure the ends of the springs and the end of cable 11 to the fitting. The fitting 15 has an extension 17 for insertion into a socket 18 and the socket 18 has an opening 19 for receiving and driving a fitting, such as nut 20.

The other end of the coil springs of layers 12 and 13 are rigidly secured by weld metal 21 in an opening 22 formed at the end of a second fitting 23 comprising the cam follower member. The other end of the cable 11 projects loosely through a central opening 24 in the member 23 and through an opening 25 in cam driver member 26. The member 26 has a square end opening 27 in which is located a washer 28 rigidly secured to the end of the cable 11, while the washer 28 is free to rotate relative to the member 26. The cam driver member 26 has a V-shaped cam surface 29 which co-operates with a V-shaped groove 30 in the cam follower member 23 and the spring layers 12 and 13 normally hold the cam follower member 23 against the cam driver member 26, which in, turn, is held in place by the washer 28 secured to the cable 11 at the proper location. Both the cam members 23 and 26 are circular in cross section and are surrounded by a cylindrical member 31 having an end portion 32. The member 31 is rigidly fixed to the cam driver member 26 by a plurality of pins 33 and the end portion 32 contains a square opening 34 of the same size as the opening 27 for receiving the square end 35 of a driving wrench or other suitable instrument.

In operation, torque is transmitted from the driving member 35 to a fitting, such as nut 20, through the co-operating cam surfaces 29 and 30 and either spring layer 12 or 13. The shank 10 can be either straight or assume a curved shape to obtain access to the fitting. A tightening force applied to nut 20 would be transmitted through layer 12 of the coil spring since a torque in this direction would tend to unwind the coil springs of layer 13. If a removal torque is applied to nut 20, this torque would be transmitted through layer 13 and would be in a direction to unwind the coil springs of layer 12. When the tool is utilized with the shank 10 straight, as illustrated in Figure 1, slight clearances will initially exist between the coils of the spring and also a small clearance will initially exist between the surfaces 29 and 30. When a torque is applied to the nut 20 while the shank 10 is straight, the cam action between surfaces 29 and 30 will cause the member 26 to twist relative to the member 23 in order to take up the initial clearance between the coils and make the shank 10 more rigid and, of course, the amount of twist between members 26 and 23 will be determined by the amount of torque which will be applied to the nut 20. When the coil springs of shank 10 are compressed to the maximum for maximum rigidity and high torque transmission, the maximum twist between members 26 and 23 is shown in Figure 4. Thus, the cam action of these members, while the shank 10 is straight, serves to shorten up the coil springs as well as to wind up the torque transmitting spring layer so that the shank will not buckle. Thus, the cam action keeps a compressive pressure on the coils and maintains them tight together and tight against the cable.

When it is necessary to bend the shaft 10 in order to obtain access to the fitting, this bending causes a compression of the spring layers to take up the slight clearances between the coils in an amount determined by the amount of bend. Thus, the application of a torque to the tool when the shank 10 is bent will result in an amount of movement between members 26 and 23 which becomes progressively less as the bend in the shank becomes greater since as the bend increases, the coils of the spring become initially more compact. When the shank 10 is bent to a maximum amount, only slight relative movement between members 23 and 26 would result in order to apply maximum compressive force while the shank is thus bent in order to keep the coils together and to prevent warping. It is understood that the initial clearance between the coils of the springs is necessary since if there was no clearance, the springs would not be allowed any play on the cable and it would be impossible to bend the shank 10.

The cam members 26 and 23 serve to take up any slack between the coils as the torque is applied and will compress the coils along the axis of the cable to keep the coils together and tighten the coils against the cable to prevent warping of the shank. Whether the cable shank is straight or bent, the application of the torque will maintain the layers of coil springs tightly together and at the same time, will twist the torque applying coils to reduce somewhat the length of the cable. In general, the amount of relative twist between members 23 and 26 to obtain maximum torque transmission will depend upon how much initial compression of the spring layers results from bending of the shank 10. Also, for any given curvature of the shank 10, the amount of twisting between members 26 and 23 will be a function of the magnitude of the torque required to move the fitting 20 in either direction. Normally, the simple twisting of either spring layer (without the cable 11) would not develop air axial compressive force on the coils of the spring sufficient to prevent warping and looping of the shank when high torque transmittal is required. However, the present invention provides an additional axial compression of the spring coils to make the shank 10 considerably more rigid and to permit the transmission of high torques from tool 35 to fitting 20.

As illustrated in Figure 5, the outer surface 23a of member 23 is hexagonal in shape so that a wrench or other implement can be applied directly to the fitting 23. In such case, increased torque transmission to the nut 20 would result from the twisting of either the spring layer 12 or 13 by a wrench applied to surface 23a while simultaneously an axial compression force is developed by coaction of the cam members 23 and 26. It is understood that the member 31 maintains the members 23 and 26 in alignment while permitting relative angular displacement between these two members and that the end member 32 of the sleeve could be eliminated if so desired. Also, any suitable method could be utilized to secure the ends of the coil springs to the end fitting 15 and to the cam follower member 23. It is desirable to have the spring layer 12 fit snugly around the cable 11 and for the spring layer 13 to fit snugly around the layer 12 so that these members serve to support each other.

In the modification of Figure 6, a shank 10a is composed of a single spring layer 12a formed of two separate coil springs, both wound in the same direction around a central cable 11a. One end of the spring layer 12a is rigidly secured to the fitting 15 by welding, as in the prior embodiment. However, the opposite ends of the coils of layer 12a are secured to the cam follower member 23a by securing the ends 36 into slots 37 of member 23a. The central cable 11a passes through the member 23a and connects with a cam drive member (not shown) in order to place an axial compression on the single layer 12a. Thus, the modification of Figure 6 is identical in operation to the device of Figure 1 except that only a single spring layer is provided to transmit a torque in only a single direction.

By the present invention, a flexible tool is provided in which high torques can be transmitted to a fitting, access to which is difficult. Since the shank 10 of the tool is flexible, it can be bent into various shapes to gain access to the fitting. The warping or looping of the flexible shank 10 under high torque loads is prevented because of the axial compressive force applied to the spring coil surrounding the central cable 11. It is understood that the spring layers 12 and 13 can each be formed from a single helical wound coil instead of from two coils and that any desirable number of oppositely wound spring layers can be placed around the central cable. Various modifications of the structure of the subject invention have been suggested herein and various other modifications are contemplated by those skilled in the art without departing from the spirit and scope of the invention as herein defined by the appended claims.

What is claimed is:

1. In a flexible tool for transmitting a torque, a flexible shank comprising a central cable surrounded by coil spring means, an end fitting rigidly secured to one end of said spring means and to one end of said cable, a first cam member secured to the other end of said spring means, an opening in said first cam member for passage of the other end of said cable, a first cam surface on said first cam member, a second cam member having a second cam surface cooperating with said first cam surface, a passage in said second cam member for receiving said other end of said cable, means for retaining said second cam member by said other end of said cable, and means for applying a torque to said second cam member in order to impart said torque through said cam surfaces and said spring means to said end fitting, said cam surfaces being shaped to cause compression of said spring means in an axial direction upon relative rotation between said cam members caused by the applied torque.

2. In a flexible tool as defined in claim 1 wherein said first cam surface comprises a groove in said first cam member and said second cam surface comprises a surface on said second cam member insertable within said groove, the relative rotation of said cam members causing axial movement of said second cam member.

3. In a flexible tool as defined in claim 2 wherein said second cam member has a depression therein in alignment with said passage, said retaining means being located in said depression and secured to said other end of said cable.

4. In a flexible tool, a flexible shank comprising a central cable surrounded by coil spring means, an end member secured to one end of said spring means and to one end of said cable, a second member secured to the other end of said spring means and containing an opening for passage of said cable, cam means restrained by the other end of said cable at a fixed spaced distance from the said end member, and cam surfaces on said second member and said cam means for moving said second member toward said end member upon relative rotation between said cam means and said second member under the influence of an applied torque in order to compress said spring means and make said shank more rigid.

5. In a flexible tool as defined in claim 4 wherein said spring means comprises a first layer of helical coil spring wound in one direction about said cable, and a second layer of helical coil springs wound in the opposite direction about said first layer in order to transmit torques in opposite directions to said end member.

6. In a flexible tool as defined in claim 4 wherein said cam surfaces comprise a wedge shaped surface on said cam means and a groove in said second member normally receiving the full wedge surface when said spring means is not transmitting a torque, said cam member receiving said torque and transmitting said torque through said grooved surface, and means surrounding said cam member and said received member for maintaining alignment of same during said relative rotation.

7. In a flexible tool as defined in claim 4 wherein said end and said second member have sockets for receiving the opposite ends of said spring means, said spring means being secured within said sockets by weld metal.

8. In a flexible tool as defined in claim 5 wherein said cam means contains an enlarged opening for receiving a torque applying tool and means contained within said opening and secured to the other end of said cable for restraining said cam means.

9. In a flexible tool, a flexible shank comprising a cable and coil spring means, an end member secured to one end of said spring means and to one end of said cable, a second member secured to the other end of said spring means, a third member restrained by the other end of said cable at a fixed distance from said end member, and cam surfaces on said second member and third members for moving said second member toward said end member to compress said spring means upon the application of torque to said third member.

References Cited in the file of this patent

UNITED STATES PATENTS

| | | |
|---|---|---|
| 1,429,146 | Karge | Sept. 12, 1922 |
| 2,012,916 | Pott | Aug. 27, 1935 |
| 2,656,699 | Chapin | Oct. 27, 1953 |
| 2,747,384 | Beam | May 29, 1956 |